June 24, 1930.  C. B. SAWYER  1,766,148
FLOW METER
Filed Sept. 21, 1925   2 Sheets-Sheet 1

Inventor
C. B. Sawyer

By Lloyd L. Evans
Attorney

Patented June 24, 1930

1,766,148

UNITED STATES PATENT OFFICE

CHARLES B. SAWYER, OF CLEVELAND, OHIO, ASSIGNOR TO THE BRUSH LABORATORIES COMPANY, OF CLEVELAND, OHIO, A CORPORATION OF OHIO

FLOW METER

Application filed September 21, 1925. Serial No. 57,549.

My invention relates to meters, and more particularly to meters adapted to determine characteristics of fluids, such as, for example, rate of flow.

In the arts it frequently becomes desirable to determine a characteristic or property of a fluid, such as of a vapor or gas. Thus, for example, it frequently becomes desirable to measure the quantity of steam passing through a conduit, in which case the characteristic to be determined is the rate of flow. It is desirable to determine such characteristics with a measuring apparatus or meter which is simple and rugged in design and construction, which is cheaply operated, and by means of which a desired characteristic of the flowing fluid may be readily determined. It is further desirable in such a meter that it shall not require frequent calibration.

An object of this invention is to provide an improved method of and means for determining characteristics of fluids.

Another object of my invention is to provide a flow meter of few parts and in general of simple and rugged construction.

A further object of my invention is to provide means for readily and simply obtaining data for the determination of any desired characteristic of a fluid.

Another object of my invention is to provide a fluid meter which may be readily maintained in operative and indicating condition to provide accurate and dependable data.

A further object of this invention is to provide an instrument for the determination of characteristics of fluids in which a constant rate of heat energy is supplied to a thermally sensitive body exposed to a flowing fluid, and a fluid characteristic determined by measuring the temperature of a point on said body.

Other objects will be apparent to those skilled in the art from the description of the invention hereinafter given.

I have discovered that a very satisfactory method of determining a characteristic or property of a flowing fluid is to insert into a conduit, through which the fluid is passing, a heated body which is thermally sensitive or, in other words, a body which is responsive to variations in those properties of the surrounding fluid which affect the rate of heat exchange between the fluid and the body. Preferably this thermally sensitive body, which may take the form of a metal tube or bar, is supplied with heat at a constant rate, and elevated to a temperature above that of the flowing fluid. The temperature of any suitable point on the thermally sensitive body may then be taken, which temperature will be an indication of, and will vary with a characteristic of the fluid such as, for example, difference of the rate of flow, percentage of moisture, chemical composition etc.

I have found that the construction of a suitable meter may be simplified and that the meter may be more easily maintained accurate, if the temperature of the thermally sensitive body is taken at one particular fixed point. It will be seen that under such circumstances, the heating need not be equally distributed throughout the sensitive body, but may vary from place to place, provided that such variation is constant, which is the case when heat is supplied at a constant rate. I have found that a convenient means for supplying a constant rate of heat to the said thermally sensitive body is by electrical means such as a suitable resistor heated preferably by alternating current. To determine the absolute or relative temperature of any fixed point on the thermally sensitive body I have found that an electrical pyrometer employing a thermocouple is very satisfactory. As previously mentioned, it is desirable to have the temperature of such thermally sensitive body high enough to be always above that of the fluid. The pyrometric method of determining temperatures by employing a thermocouple is particularly advantageous in that the temperature of a particular point on a thermally sensitive body may be obtained with respect to any other temperature such as, for example, the temperature of the fluid. These relative temperatures may be obtained by placing the hot junction of the thermocouple at a point on the thermally sensitive body, and by placing the cold junction of the thermocouple at the point with respect to which it is desired to know the temperature of the hot junction. As will be noted in the further description of my invention, the thermally sensitive body may be heated by a separate source of heat, such as a resistor, or the resistor and the thermally sensitive body may be integral.

In the drawings, Figure 1 is a sectional view of an embodiment of my invention as installed in a conduit, the external electrical system being shown diagrammatically.

Figure 1:
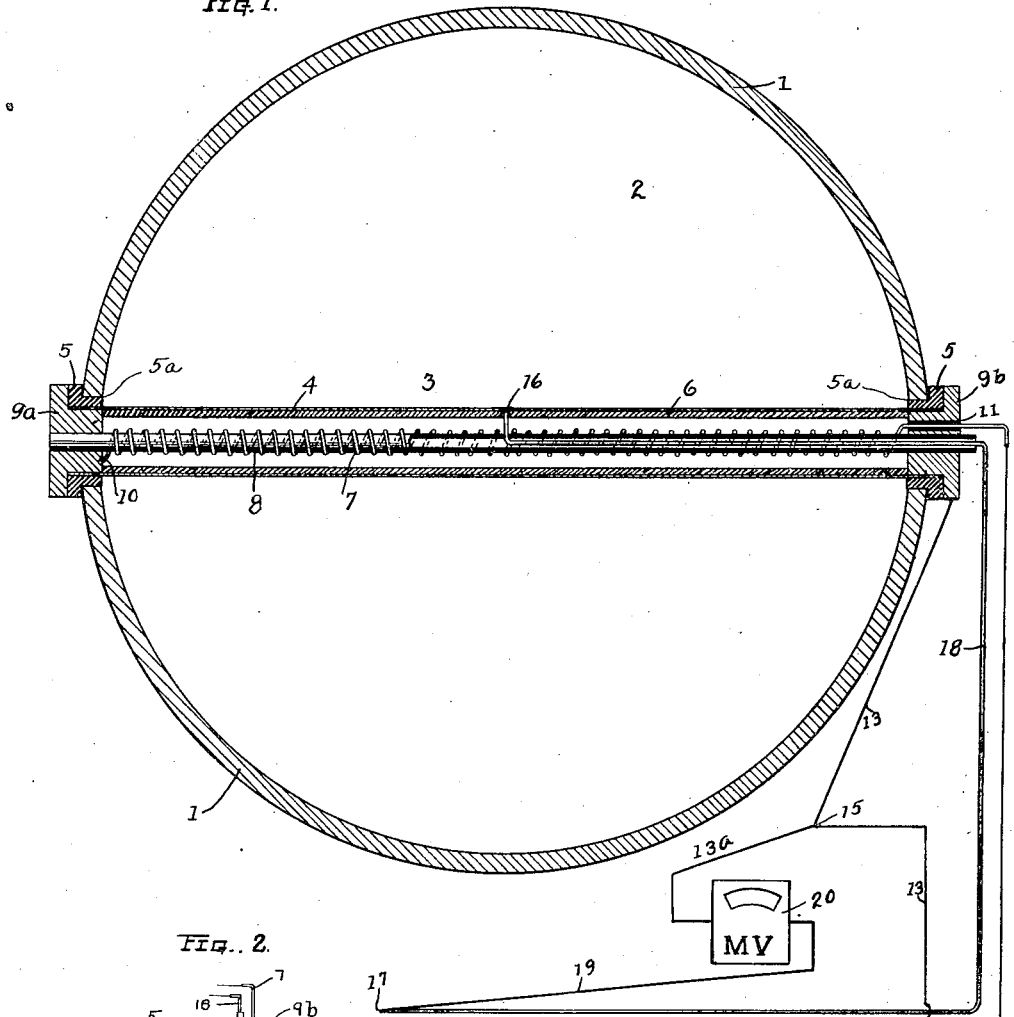

In Figure 1 is indicated a conduit 1 through which a fluid 2 which is to be metered may be passed, such as for the purpose of determining the rate of flow thereof.

At 3 is indicated generally a meter according to one embodiment of my invention. The meter 3 may comprise a thermally sensitive body 4 extending partially or entirely across the interior of the conduit, which said body 4 may comprise an iron tube insulated from the conduit 1 by insulating washers 5 disposed in apertures 5$^a$ in the conduit 1, preferably in such manner as to form a fluid-tight seal.

The body 4 may be protected on the outside, if desired, from deleterious action of the flowing fluid by any suitable protective coating, such as may be formed by electroplating, varnishing, etc. The interior of the body 4 may be lined with a partially heat insulating lining 6, when it is desired to decrease the rate of heat transfer through the body 4. In operation, alternating current heat energy is supplied preferably at a constant rate to the thermally sensitive body 4 so as to maintain said body preferably at a temperature above that of the flowing fluid 2. Said heat energy may preferably be supplied to said body 4 by means of an electric resistor 7 which may be wound and supported on an electrical insulating member 8 whose ends may be suitably supported within the member 4 by iron plugs 9$^a$ and 9$^b$ which preferably contact electrically with the iron tube 4. Preferably though not necessarily the resistor 7 is of a metal of substantially negligible temperature coefficient of resistance within the range of usage, such as constantan. It is desirable that electrical energy be furnished to the resistor 7 at a constant current in order that a constant and reproducible supply of heat may be dissipated by said resistor to the thermally senstive body 4.

The resistor 7 may be connected at one of its terminals to the plug 9$^a$ at point 10 to form electrical contact therewith. The other end of said resistor 7 may pass through aperture 11 in plug 9$^b$, the resistor 7 being insulated from the plug. Electric energy at constant current is preferably supplied to the resistor 7 from a suitable source of alternating constant current such as the constant current transformer 12. Leads 13 and 14 serve to transmit the current from the secondary winding of the transformer 12 to the resistor 7, the complete circuit comprising the secondary of transformer 12 lead 13, plug 9$^b$, tube 4, plug 9$^a$, point of contact 10, resistor 7, and lead 14.

It is desired, in order to determine a characteristic of a fluid at a certain time to determine the temperature at such time of a point 16 on the surface of the thermally sensitive body 4. Any suitable temperature measuring means may be employed for this purpose, but I prefer to employ a thermocouple pyrometric apparatus. It will be noted that in thermocouple pyrometric apparatus, there may be very readily obtained the difference in temperature between the hot and cold junction of said thermocouple, as will be readily understood by those skilled in the art. When employing a thermocouple with my apparatus, therefore, it is desired to obtain the temperature of a point 16 of the body 4 with respect to any other point 17, which temperature difference may be obtained by placing the cold junction of the thermocouple at such point 17. Such point 17 may be located either within or without the conduit. In the drawings I have shown a constantan wire 18 electrically joined, as by welding, to the body 4 at any point 16. The hot junction of the thermocouple is, therefore, formed at the junction of the tube 4 and the wire 18, namely at point 16. A suitable wire 19, such as iron, may be electrically joined to wire 18 at point 17 to form the cold junction. As previously mentioned, a cold junction 17 may be placed in any suitable location. The wire 19 is connected to a suitable electrical indicating instrument, such as a millivoltmeter or potentiometer for measuring the electric potential developed between the hot and cold junctions. As a convenient means of electrical connection to complete the pyrometric circuit the other terminal of the instrument 20 may be connected by iron lead 13$^a$ to lead 13 at point 15, the lead 13 being preferably composed of iron, at least from point 15 to the plug 9$^b$.

I have thus described the use of an iron-constantan couple for obtaining the temperature of point 16, although it is obvious that other thermoelements may be used.

In operation, current from a supply circuit 21 enters the primary windings of the constant current transformer 12, from the secondary windings of which electric energy at constant current is supplied to the resistor. Since the resistor 7 is of constant resistance, the heat energy dissipated by the resistor 7 is constant in amount. The heat is dissipated in whole or in part through the thermally sensitive body 4 into the flowing fluid 2. The temperature of any point 16 on the body 4 will depend on the charactertistic of the fluid which is to be metered. Such characteristic may be, for example, the rate of flow. It is obvious that the temperature of the point 16 will depend on the particular characteristic of the fluid. Thus, for example, a faster flowing fluid will carry away more heat from the body 4 and hence decrease the temperature of the point 16 to a greater degree than will a slower flowing fluid. Thus, from suitable calibration curves, the characteristic of the fluid may be determined from the temperature of the point 16. It will be understood, of course, that the instrument may be calibrated with respect to the difference in temperature between the point 16 and the cold junction 17, in which case the point 17 will be located at some particular place, such as, for example, in the flowing fluid itself.

It will be readily understood that since the temperature of but one point of the thermally sensitive body 4 is measured, it is not essential that the temperature of all parts of the body 4 be equal. Thus, the resistor 7 need not be wound with great uniformity or precision, need not be of any definite length, and may be of sufficiently heavy wire to give long life and ruggedness to the resistor 7.

Figure 2:
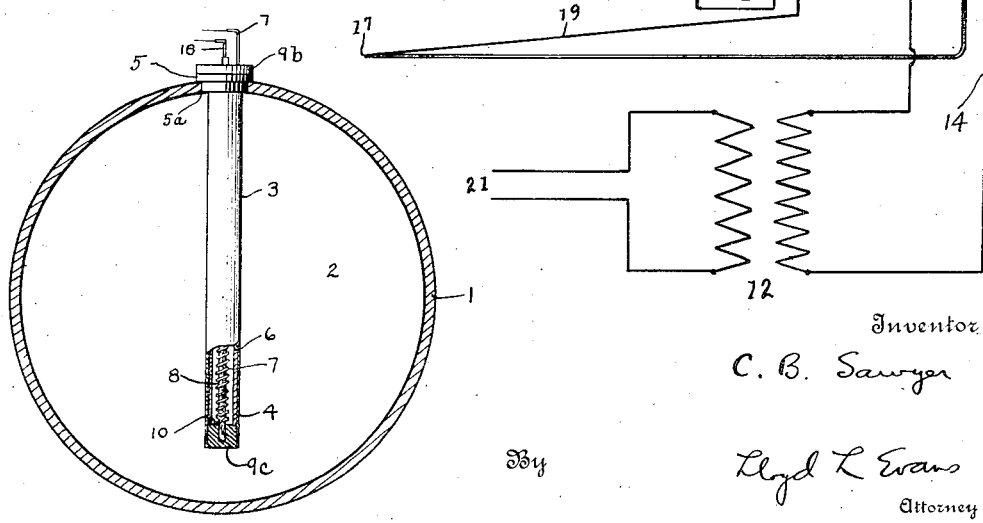
Figure 2 is a transverse sectional view of a conduit showing a meter similar to that illustrated in Figure 1 installed therein and solely supported from one end, the meter being shown partially in section and partially in elevation.

It will be noted that my apparatus may be suitably mounted in the conduit 1 so that but one aperture is necessary in the conduit, as shown in Figure 2. Whether it is desirable to mount my apparatus in one or more apertures in the conduit, will depend upon local conditions. In Figure 2, the meter 3 is shown as being of less length than the diameter of the conduit. The insulating member 8 is supported in the plug 9c which contacts electrically with the tube 4 and with the resistor 7. The meter shown in Figures 1 and 2 may of course, be supported either horizontally or vertically as desired.

Figure 3:
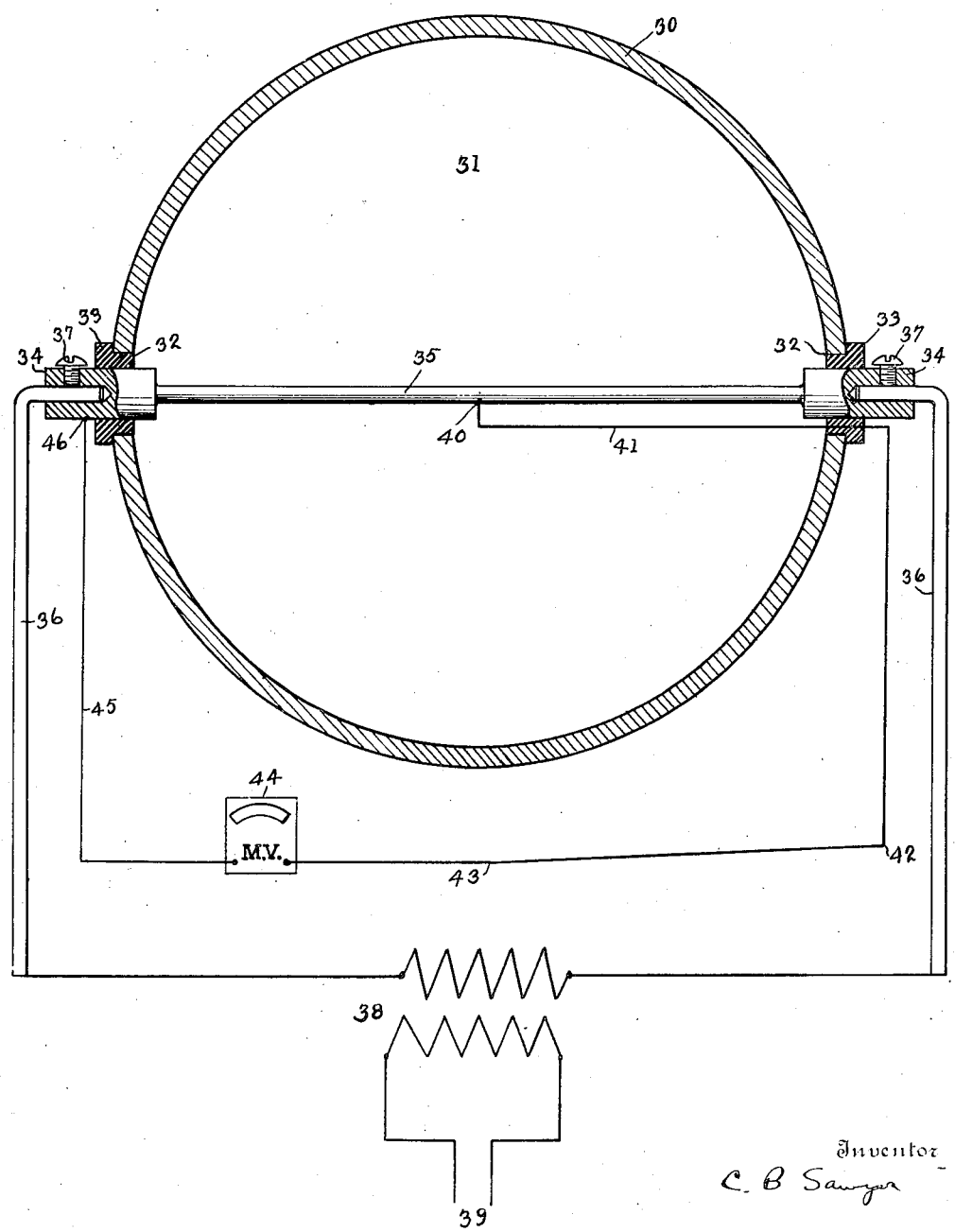
Figure 3 is a sectional view of a modified form of my invention, the electrical system being shown diagrammatically.

In Figure 3 is indicated a modified and simple embodiment of my invention, in which a single body may be employed to act both as resistor and as a heat dissipating medium to dissipate heat to the fluid flowing in the conduit. A conduit 30 is shown within which may flow a fluid 31. In apertures 32 are shown insulating plugs 33 in which are mounted the enlarged shoulders 34 of the member 35 which may preferably consist of constantan. In operation, heat is supplied to the member 35 at a constant rate and is dissipated to the flowing fluid 31. When employing a member 35 of a negligible coefficient of resistance, said constant supply of heat may be produced by passing electric energy at constant current through said member 35. In the drawings are shown leads 36 electrically connected to portions 34 and held in place by screws 37, said leads being connected to a constant current transformer 38 which is shown as supplied with electric energy from an alternating current supply circuit 39. With the above described electrical means, it is obvious that heat energy may be supplied to member 35 at a constant rate. The temperature of any point 40 on member 35 will be dependent upon the particular characteristic of the flowing fluid. The temperature of point 40 may be conveniently measured by electrically connecting a suitable thermocouple wire, such as iron wire 41, to the member 35 at point 40, the point 40 forming the hot junction between member 35 and wire 41. Wire 41 may lead through insulating plug 33 to cold junction 42 located at any suitable point, said wire 41 connecting at 42 with a constantan wire 43 connected to indicating apparatus such as a millivoltmeter or potentiometer 44. A constantan wire 45 may be connected from the other terminal of the instrument 44 to the shouldered portion 34 at point 46, thus completing the pyrometric circuit. The cold junction 42 may be located in any suitable position, either within or without the conduit.

It will be understood that the modified form of apparatus shown in Figure 3 is simple and rugged in construction and reliable in its results. Since in operation the temperature of but one point 40 of the member 35 is measured, said member 35 need not be of exactly uniform cross section, whereby the manufacture of said member 35 is greatly simplified.

It will be understood that my invention may be employed not only to measure quantities or amounts of fluids, such as of gases and liquids, but may also be used to determine other fluid characteristics such as chemical composition, percentage of moisture, etc., in which case the fluid may be either moving at a constant rate or stationary, the fluid characteristic being determined by the change of temperature of a point in the thermally sensitive body when such body is immersed in the fluid.

It will be seen that in my invention, with the improved apparatus, I am enabled to supply heat to a thermally sensitive body not only at a constant rate but also at a reproducible rate so that the results obtained at one time may be readily compared and correlated with results obtained at any other time. The simplicity and ruggedness of the apparatus and method of obtaining measurements also assist in obtaining reliable results and reduce, to a great extent, the necessity for frequent calibration of the apparatus.

It will also be noted that by my invention I have provided simple and reliable means for determining the characteristics of fluids which means may be readily constructed and maintained in operating condition without difficulty. It is, of course, obvious that the drawings illustrate but two of the many possible means for carrying out my invention.

To those skilled in the art, many modifications and widely differing embodiments of my invention will be apparent, and my invention is to be in nowise limited by the disclosures contained herein, except as limited by the appended claims.

What I claim is:

1. In a device of the class described for determining the rate of flow of a fluid, the combination of a metal tube placed in heat interchanging relation with the flowing fluid, an electric resistor within the tube, means for supplying electric energy at a constant rate to the resistor, and a thermocouple pyrometer for measuring the temperature of a point on the metal tube.

2. In a device of the class described for determining the rate of flow of a fluid, the combination of a metal tube placed in heat interchanging relation with the flowing fluid, an electric resistor of negligible temperature coefficient of resistance within the tube, a source of electric energy at constant current for the resistor and a thermocouple pyrometer for measuring the temperature of a point on the metal tube.

3. In a device of the class described for determining the rate of flow of a fluid, the combination of a metal tube placed in heat interchanging relation with the flowing fluid, an electric resistor of constantan within the tube, a constant current transformer for providing electric energy at constant current for the resistor, and a thermocouple pyrometer for measuring the temperature of a point on the metal tube.

4. In a device of the class described for determining the rate of flow of a fluid, the combination of a metal tube placed in heat interchanging relation with the flowing fluid, an electric resistor of constantan within the tube, a constant current transformer for providing electric energy at constant current for the resistor, a wire connected to the metal tube at the point at which the temperature of the tube is to be noted, the tube and wire forming, at the point of connection, the hot junction of a thermoelement having hot and cold junctions and means for measuring the electric potential developed between the hot and cold junctions.

5. In a device of the class described for determining the characteristic of a fluid, the combination of a heater element, a thermally sensitive element adapted to receive heat from said heater element, said thermally sensitive element being positioned in heat interchanging relation with the fluid, means for supplying electrical energy at a constant rate to the heater element and means for measuring the temperature of a point on the thermally sensitive element.

6. In a device of the class described for determining the rate of flow of a fluid, the combination of a metal tube placed in heat interchanging relation with the flowing fluid, a lining of heat insulating characteristics within said tube, an electric resistor of constantan within the tube interiorly of said lining, a constant current transformer for providing electric energy at constant current for the resistor, a wire connected to the metal tube at the point at which the temperature of the tube is to be noted, the tube and wire forming at their point of connection the hot junction of a thermoelement having hot and cold junctions, and means for measuring the electric potential developed between the hot and cold junctions.

7. In a device of the class described, in combination, a thermally sensitive body arranged to be disposed in heat interchanging relation with a fluid, means for supplying electrical heat to said thermally sensitive body including a constant current transformer receiving electric energy from a source of alternating current supply, whereby said thermally sensitive body may be heated at an automatically controlled rate and means for determining a temperature of said thermally sensitive body, whereby a characteristic of said fluid may be determined.

8. In a meter for determining a characteristic of a fluid, in combination, a thermally sensitive body arranged to be disposed in heat interchanging relation with a fluid, a resistor associated with said thermally sensitive body to transmit heat thereto, means for supplying alternating current to said resistor including a constant current transformer whereby said thermally sensitive body may be heated at an automatically controlled rate and means for determining a temperature of said thermally sensitive body.

In testimony whereof I affix my signature

CHARLES B. SAWYER.